(12) United States Patent
Cant et al.

(10) Patent No.: US 8,794,587 B2
(45) Date of Patent: Aug. 5, 2014

(54) MOUNTING APPARATUS

(75) Inventors: Andrew Cant, Grantham (GB); Philip Twell, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 286 days.

(21) Appl. No.: 13/392,924

(22) PCT Filed: Sep. 2, 2009

(86) PCT No.: PCT/EP2009/061345
§ 371 (c)(1),
(2), (4) Date: Feb. 28, 2012

(87) PCT Pub. No.: WO2011/026516
PCT Pub. Date: Mar. 10, 2011

(65) Prior Publication Data
US 2012/0168601 A1 Jul. 5, 2012

(51) Int. Cl.
*F01D 9/00* (2006.01)
(52) U.S. Cl.
USPC .................. 248/672; 415/190; 415/209.4
(58) Field of Classification Search
CPC ......... F02K 1/80; F01D 5/3053; F01D 5/323; F01D 25/246; F01D 25/28; F05B 2230/608; F05B 2230/606
USPC ............... 248/672; 415/190, 209.4, 210.1
See application file for complete search history.

(56) References Cited

U.S. PATENT DOCUMENTS

| 2,180,168 | A | * | 11/1939 | Puffer ............................ 290/52 |
| 3,498,727 | A | * | 3/1970 | Bollinger, Jr. et al. ........ 415/136 |
| 4,112,582 | A | | 9/1978 | Beckershoff |
| 4,286,921 | A | * | 9/1981 | Donlan et al. ................ 415/136 |
| 4,890,978 | A | | 1/1990 | Donlan |
| 5,141,394 | A | * | 8/1992 | Donlan ......................... 415/190 |
| 5,308,226 | A | * | 5/1994 | Venkatasubbu et al. ...... 415/160 |
| 5,848,874 | A | * | 12/1998 | Heumann et al. ............. 415/189 |
| 2005/0172638 | A1 | | 8/2005 | Czachor |
| 2007/0237646 | A1 | | 10/2007 | Shi et al. |

FOREIGN PATENT DOCUMENTS

| CN | 2209272 Y | 10/1995 |
| CN | 100400801 C | 7/2008 |
| CN | 201211620 Y | 3/2009 |

(Continued)

OTHER PUBLICATIONS

Gates Product Application Notes. "Taper-Lock® and QD® Bushing Installation and Removal" vol. 53, No. 8 Oct. 2006.

(Continued)

*Primary Examiner* — Anita M King

(57) ABSTRACT

A mounting apparatus includes a mounting pin having first and second ends, and a support having first and second sides. The support includes a passage between the first and second sides for receiving the mounting pin so that the first end of the pin protrudes from the first side and the second end of the pin protrudes from the second side. The second end of the pin engages an article to be mounted by the mounting apparatus. The first end rotates the pin about the axis of the pin to vary the position of a mounted article. A clamping plate clamps the first end of the mounting pin to the first side of the support for securing the rotational position of the pin with respect to the support.

8 Claims, 5 Drawing Sheets

(56) References Cited

FOREIGN PATENT DOCUMENTS

| | | | |
|---|---|---|---|
| EP | 0080745 | A1 | 6/1983 |
| FR | 1236595 | A | 7/1960 |
| GB | 2261708 | A | 5/1993 |
| JP | 2004084855 | A1 | 3/2004 |

OTHER PUBLICATIONS

Tsubaki Emerson Co., Innovation in Motion, "Power-Lock" Catalogue; Catalog No. 985K521, Sep. 2006, Printed in Japan.

* cited by examiner

MOUNTING APPARATUS

CROSS REFERENCE TO RELATED APPLICATIONS

This application is the US National Stage of International Application No. PCT/EP2009/061345, filed Sep. 2, 2009 and claims the benefit thereof. All of the applications are incorporated by reference herein in their entirety.

FIELD OF INVENTION

The present invention relates to a mounting apparatus.

More particularly the present invention relates to a mounting apparatus comprising: a mounting pin having first and second ends; a support having first and second sides, the support including a passage between the first and second sides for receiving the mounting pin so that the first end of the pin protrudes from the first side and the second end of the pin protrudes from the second side, the second end of the pin being configured to engage an article to be mounted by the mounting apparatus, the first end of the pin being operable to rotate the pin about the axis of the pin to vary the position of a mounted article; and a clamping plate for clamping the first end of the mounting pin to the first side of the support for securing the rotational position of the pin with respect to the support.

BACKGROUND OF INVENTION

It is known to use such a mounting apparatus in a gas turbine engine. FIG. 1 is a perspective view of a higher pressure section of an axial compressor of a gas turbine engine. The higher pressure section comprises an axially extending rotor 1, rotating blades 3 mounted on rotor 1, stationary vanes 5 that direct air onto rotating blades 3, stationary vane carriers 7 that hold in place stationary vanes 5, a cylindrical outer casing 9, radially extending mounting pins 11, and clamping plates 13. Three mounting apparatus can be seen in. FIG. 1, each comprising a mounting pin 11, the clamping plate 13 associated with the mounting pin, and outer casing 9 (the three mounting apparatus share the same outer casing). Each mounting apparatus seen in FIG. 1 assists in mounting a respective stationary vane carrier 7 (and the stationary vanes 5 it holds in place).

FIG. 2 is a cross section of the higher pressure section of FIG. 1, taken in a plane perpendicular to the longitudinal axis of the higher pressure section, and shows only a stationary vane carrier 7 and cylindrical outer casing 9. In FIG. 2 each of the four dashed lines 15a, 15b, 15c, 15d signifies a mounting pin 11 and associated clamping plate 13. The mounting pin 11 of each dashed line 15a, 15b, 15c, 15d locates within a respective axially extending slot 33a, 33b, 33c, 33d formed in stationary vane carrier 7. Stationary vane carrier 7 and cylindrical outer casing 9 each comprise two half cylinders of semicircular cross section, see split lines 17.

FIG. 3 shows in greater detail the region of dashed line 15a in FIG. 2. FIG. 3 shows the mounting pin 11 and clamping plate 13 comprising dashed line 15a. FIG. 4 is a perspective view of the mounting pin and clamping plate of FIG. 3. FIG. 5 is a perspective view of the mounting pin only of FIG. 3. Mounting pin 11 has first and second ends 19, 21. Outer casing 9 has first and second sides 23, 25, and includes a passage 27 between these sides. Mounting pin 11 is disposed within passage 27 so that first end 19 of the pin protrudes from first side 23 of outer casing 9 and second end 21 of the pin protrudes from second side 25 of the outer casing. Second end 21 of the pin comprises an eccentric 29, comprising a cylindrical element the axis of which is offset from the axis of the overall mounting pin 11. Eccentric 29 is located within a key block 31. Rotation of mounting pin 11 about its axis varies the position of eccentric 29 and hence key block 31. First end 19 of the pin comprises a hexagonal head 35 to facilitate rotation of the pin. The rotational position of mounting pin 11 with respect to outer casing 9 is secured by clamping between clamping plate 13 and first side 23 of outer casing 9 a flange 41 of mounting pin 11 formed at first end 19 of the pin. Clamping plate 13 is secured in position by three bolts 37 that thread into corresponding holes 39 in outer casing 9. First end 19 of mounting pin 11 also includes an extraction tapping 43 for facilitating extraction of the pin from passage 27 following unclamping of the pin.

Key block 31 locates within axially extending slot 33a in FIG. 2. The mounting pin 11 and clamping plate 13 of each of dashed lines 15b, 15c, 15d in FIG. 2 correspond to the mounting pin 11 and clamping plate 13 shown in FIGS. 3 to 5. Thus, a key block corresponding to key block 31 locates within each of axially extending slots 33b, 33c, 33d in FIG. 2.

The four mounting apparatus of FIG. 2 are used to adjust and then secure the position of the stationary vane carrier 7 of FIG. 2 so that it and the stationary vanes 5 it holds in place are properly aligned with respect to rotor 1 and rotating blades 3, see FIG. 1. For example, if it is desired generally to raise the stationary vane carrier 7 of FIG. 2, then this can be achieved by corresponding rotation of the mounting pins 11 of dashed lines 15a and 15b in FIG. 2.

Temporary removal of a stationary vane carrier 7 requires removal of its mounting pins 11 which requires unclamping of the clamping plates 13 securing the mounting pins. This results in loss of the correct rotational positions of the mounting pins with respect to outer casing 9, with the consequence that on replacement of stationary vane carrier 7 it is necessary to determine again these correct rotational positions. This is time consuming and labour intensive.

SUMMARY OF INVENTION

According to the present invention there is provided a mounting apparatus comprising: a mounting pin having first and second ends; a support having first and second sides, the support including a passage between the first and second sides for receiving the mounting pin so that the first end of the pin protrudes from the first side and the second end of the pin protrudes from the second side, the second end of the pin being configured to engage an article to be mounted by the mounting apparatus, the first end of the pin being operable to rotate the pin about the axis of the pin to vary the position of a mounted article; and a clamping plate for clamping the first end of the mounting pin to the first side of the support for securing the rotational position of the pin with respect to the support, characterised in that: the first end of the pin includes a first locking taper which, with progression along the axis of the pin away from the second end of the pin, tapers from a first radial distance from the axis to a second reduced radial distance from the axis; and the clamping plate includes a second locking taper complementary to the first locking taper for locking with the first locking taper.

BRIEF DESCRIPTION OF THE DRAWINGS

The invention will now be described, by way of example, with reference to the accompanying drawings, in which.

DETAILED DESCRIPTION OF INVENTION

Figure 1:
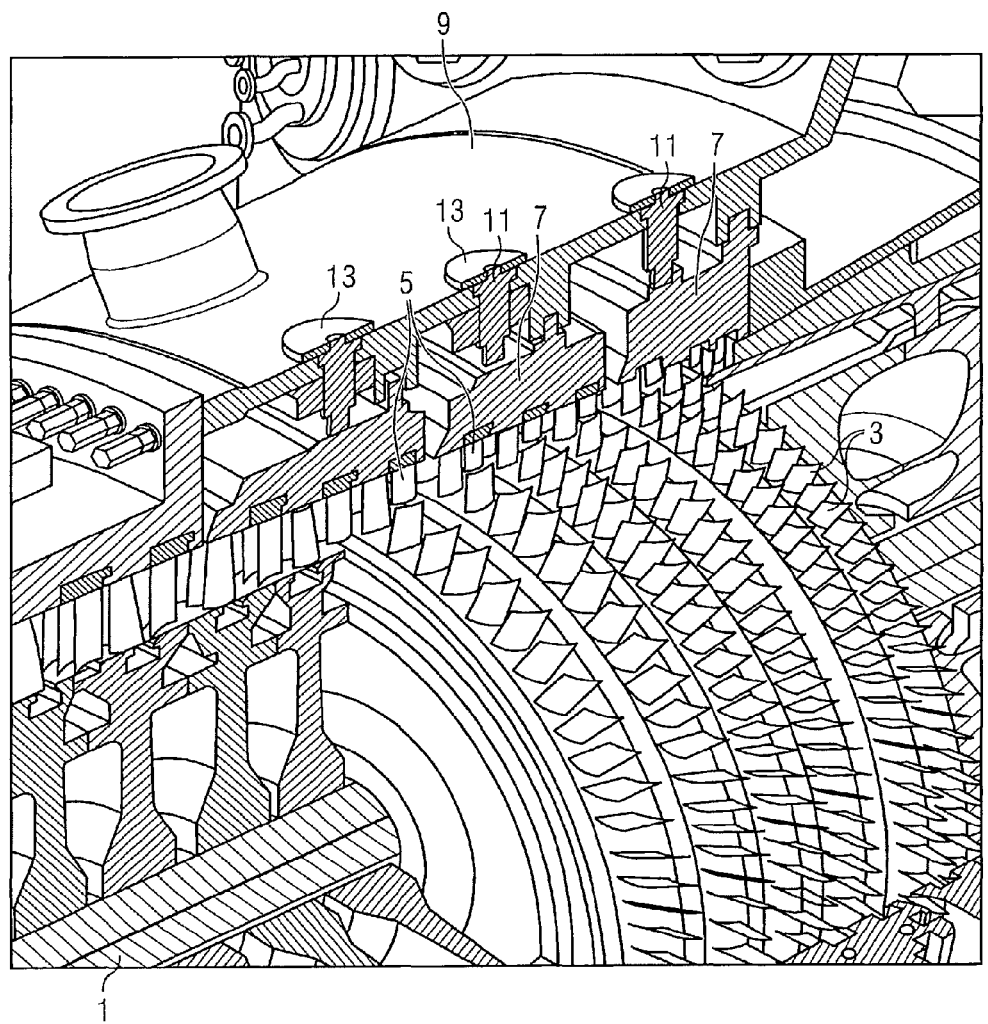
FIG. 1, already referred to, is a perspective view of a higher pressure section of an axial compressor of a gas turbine engine.
Figure 2:
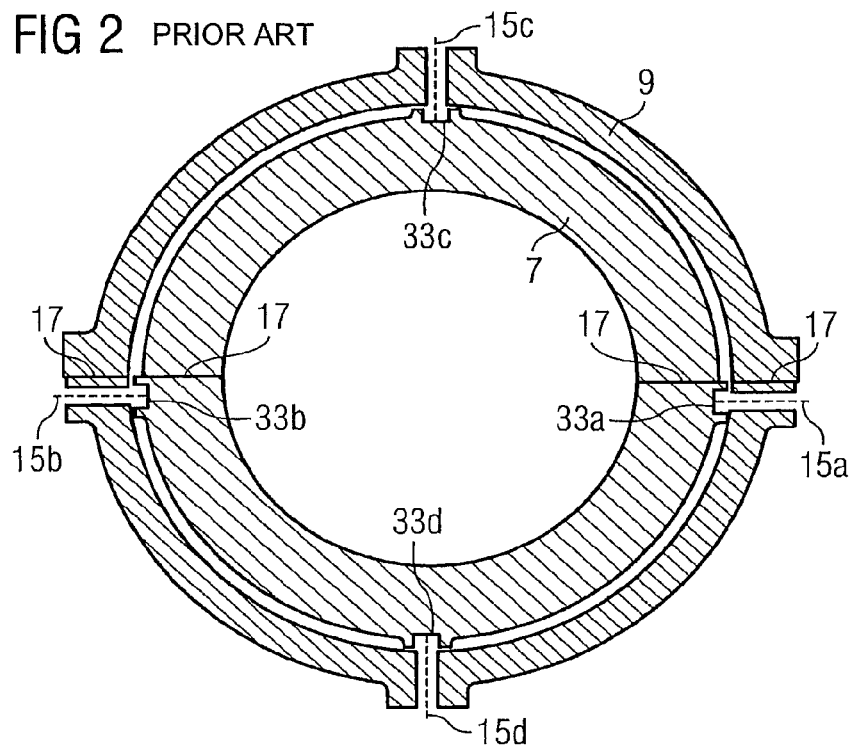
FIG. 2, already referred to, is a cross section of the higher pressure section of FIG. 1, taken in a plane perpendicular to a longitudinal axis of the higher pressure section, and shows only a stationary vane carrier and a cylindrical outer casing of the higher pressure section.
Figure 3:
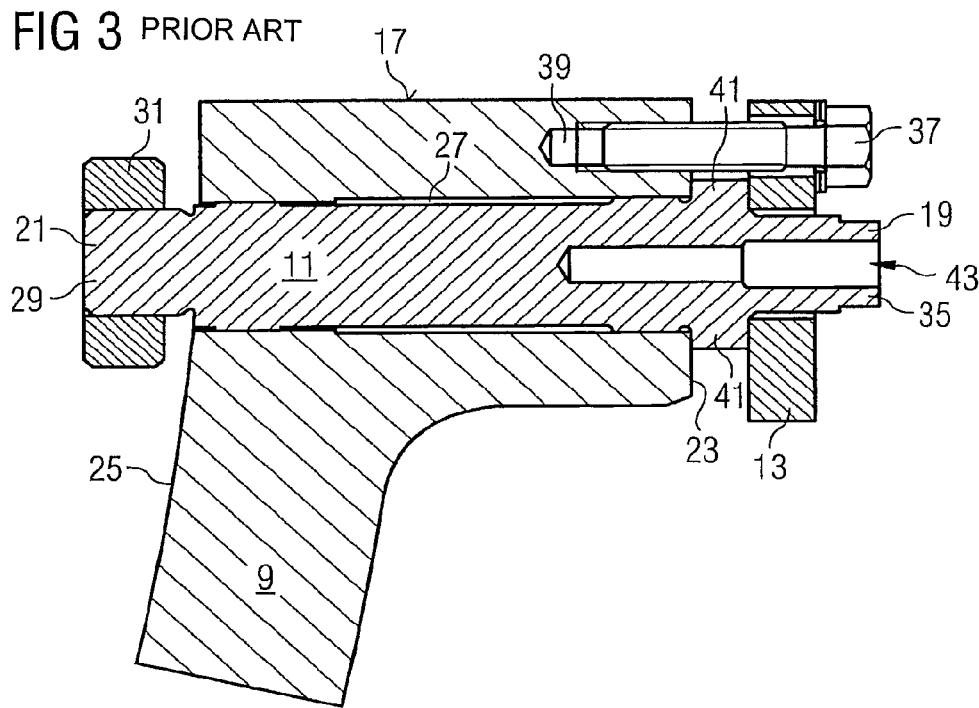
FIG. 3, already referred to, shows in greater detail the region of a dashed line in FIG. 2, showing a mounting pin and a clamping plate comprising the dashed line.
Figure 4:
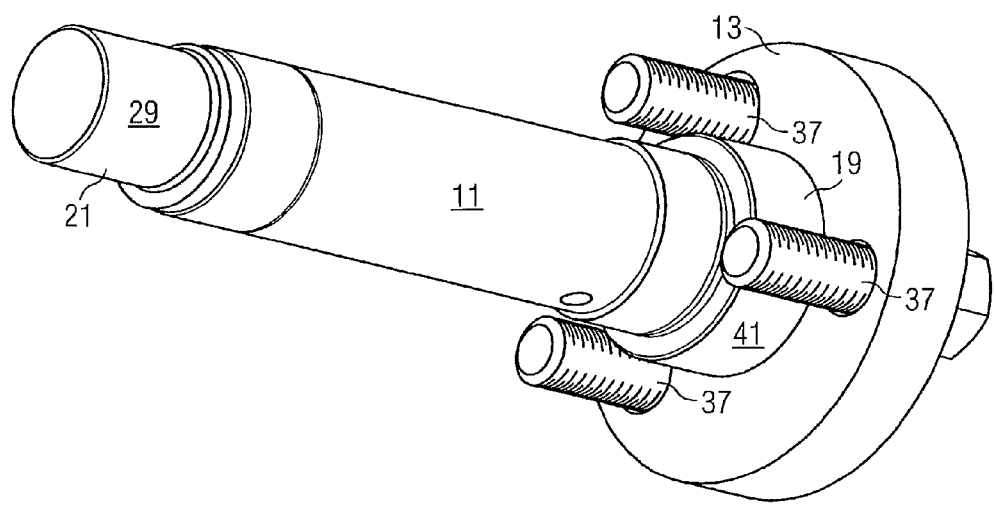
FIG. 4, already referred to, is a perspective view of the mounting pin and clamping plate of FIG. 3.
Figure 5:
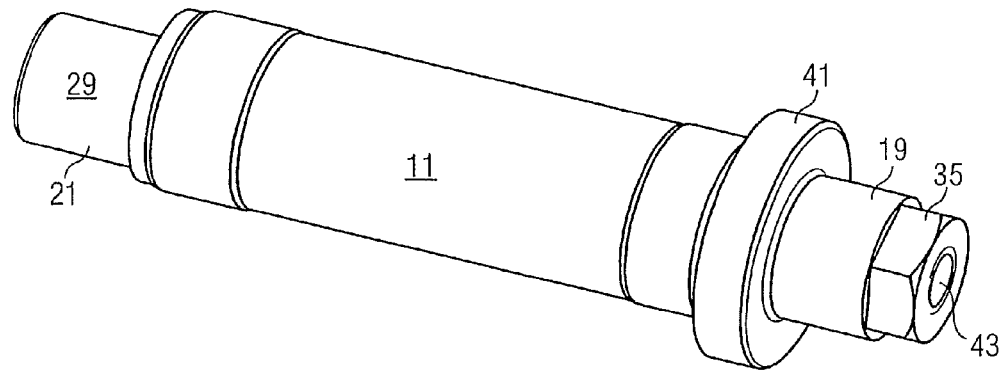
FIG. 5, already referred to, is a perspective view of the mounting pin of FIG. 3.
Figure 6:
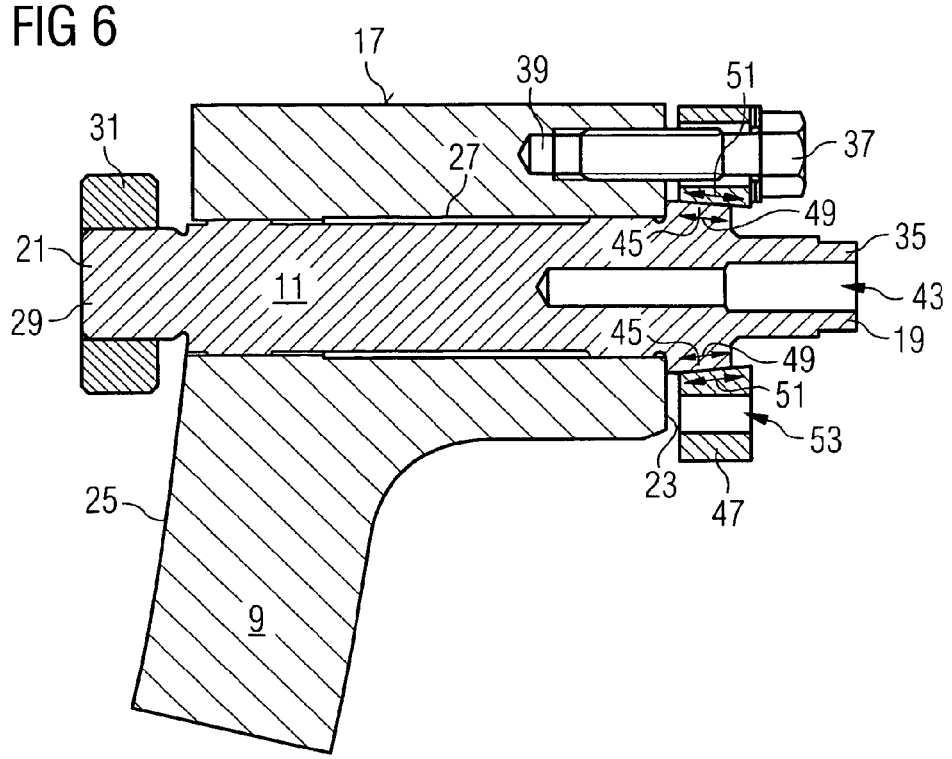
FIGS. 6, 7 and 8 correspond to FIGS. 3, 4 and 5 respectively but are of a mounting apparatus according to the present invention.
Figure 7:
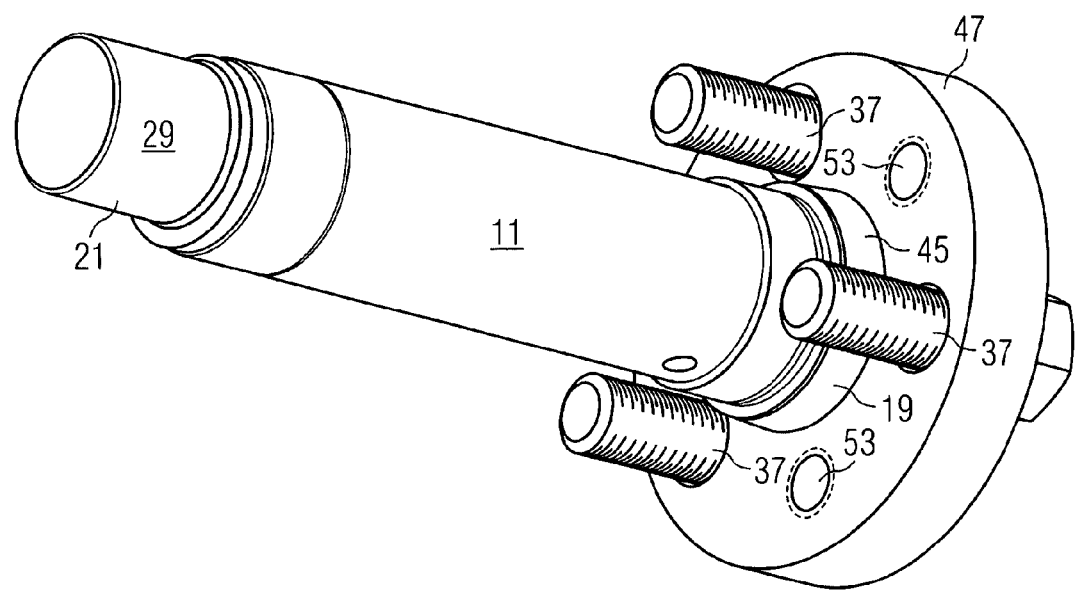
Figure 8:
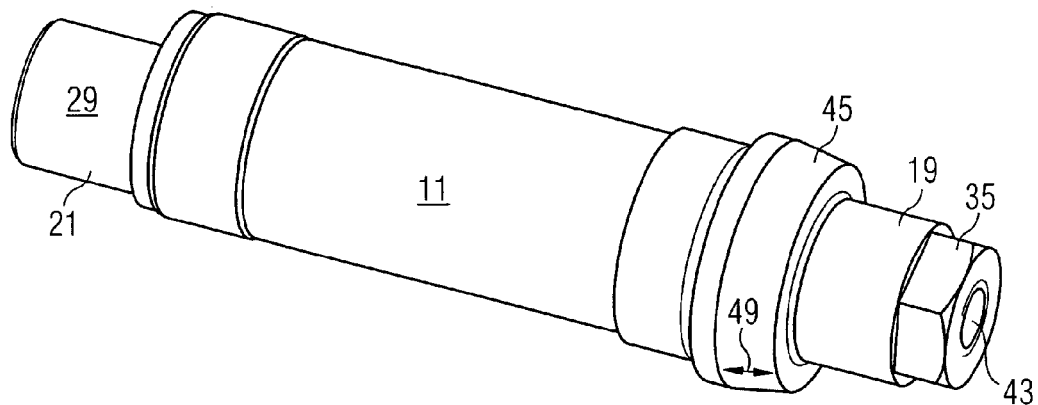

The mounting apparatus according to the present invention of FIGS. 6, 7 and 8 is the same as the mounting apparatus of FIGS. 3, 4 and 5 with the exception that: (i) flange 41 of first end 19 of mounting pin 11 of FIGS. 3, 4 and 5 is replaced by a flange 45 of first end 19 of mounting pin 11 of FIGS. 6, 7 and 8; and (ii) clamping plate 13 of FIGS. 3, 4 and 5 is replaced by a clamping plate 47 of FIGS. 6, 7 and 8.

Flange 45 differs from flange 41 in that it includes a first locking taper 49 which, with progression along the axis of mounting pin 11 away from second end 21 of the pin, tapers from a first radial distance from the axis to a second reduced radial distance from the axis. Clamping plate 47 differs from clamping plate 13 in that its central aperture comprises a second locking taper 51 complementary to first locking taper 49 of flange 45 for locking with first locking taper 49. Clamping plate 47 further differs from clamping plate 13 in that it includes three open tapings 53 positioned midway between the holes provided for bolts 37.

The mounting apparatus of FIGS. 6, 7 and 8 is used as follows.

Mounting pin 11 is rotated about its axis to a desired rotational position with respect to outer casing 9. Clamping plate 47 is then pushed over flange 45 so that second locking taper 51 of the clamping plate rides over and mates with first locking taper 49 of the flange. The taper of the first and second locking tapers is chosen to be less than about 10 degrees (i.e. the angle subtended by the tapers to the axis of mounting pin 11 is chosen to be less than about 10 degrees) so that the locking tapers when mated are self locked and require force to separate. It is to be realised that at this stage the rotational position of mounting pin 11 with respect to outer casing 9 is determined because when clamping plate 47 is pushed over flange 45 the bolt holes in clamping plate 47 are aligned with bolt holes 39 in outer casing 9. Finally, bolts 37 are threaded home to secure the rotational position of mounting pin 11. The bolts clamp flange 45 between second locking taper 51 of clamping plate 47 and first side 23 of outer casing 9.

If the need arises to remove temporarily mounting pin 11 then this is done by undoing bolts 37 and removing mounting pin 11 and clamping plate 47 as one integral unit by virtue of the self locking relationship between first and second locking tapers 49, 51. Replacement of mounting pin 11 simply comprises the reapplication of bolts 37 to clamping plate 47 and outer casing 9 as this will automatically re-establish the correct rotational position of mounting pin 11 with respect to outer casing 9. Thus, the removal of mounting pin 11 and clamping plate 47 as one integral unit (i.e. in fixed relationship to one another) means that the correct rotational position of mounting pin 11 is not lost, and is automatically re-established when the pin/plate integral unit is replaced and bolts 37 applied.

It is to be understood that if the three bolts 37 (and their bolts holes 39) are spaced equal distances apart around the axis of mounting pin 11 then there will be three possible ways in which the pin/plate integral unit can be replaced (i.e. three rotational positions about the axis of mounting pin 11 in which the pin/plate integral unit can be replaced). To ensure there is only one way in which the pin/plate integral unit can be secured to outer casing 9, rotational asymmetry of the bolts 37 (and their bolt holes 39) about the axis of mounting pin 11 is required. This asymmetry could, for example, be achieved by the three bolts (and their bolt holes) not being spaced equal distances apart around the axis of mounting pin 11, or by having one bolt (and its bolt hole) of a different diameter to the other two. Further, as an alternative to these two examples, a location pin could be provided on first side 23 of outer casing 9 and a corresponding location hole provided in clamping plate 47—when clamping plate 47 is first pushed over flange 45 the location hole would be aligned with the location pin so that the hole takes the pin.

Open tapings 53 are provided in clamping plate 47 to assist in separating (if required) self locking tapers 49, 51 to enable resetting of the rotational position of mounting pin 11 with respect to outer casing 9—a puller tool mounted on first end 19 of mounting pin 11 would utilise open tapings 53 to grasp clamping plate 47.

Figure 9:
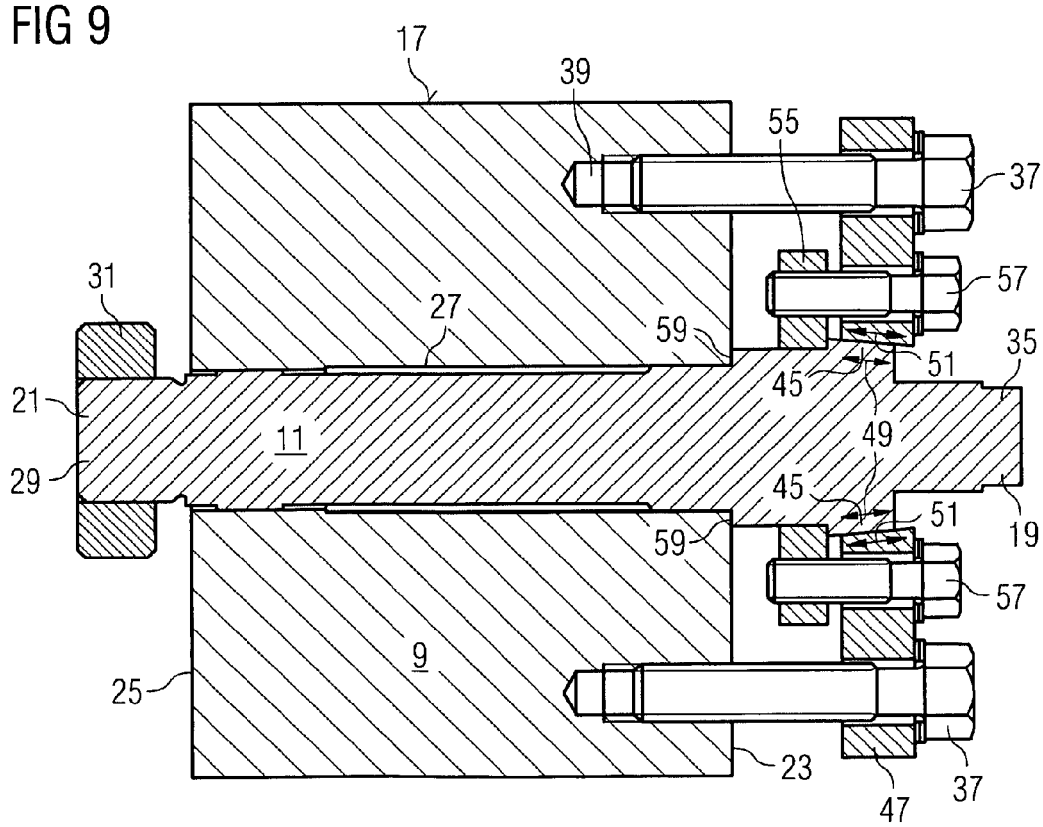
FIG. 9 corresponds to FIG. 6 but is of a further mounting apparatus according to the present invention.

The further mounting apparatus according to the present invention of FIG. 9 differs from the mounting apparatus of FIGS. 6 to 8 in that it includes the additional components: a subsidiary clamping plate 55 and further bolts 57.

The mounting apparatus of FIG. 9 is used as follows.

Mounting pin 11 is rotated about its axis to a desired rotational position with respect to outer casing 9. Clamping plate 47 is then pushed over flange 45 so that second locking taper 51 of the clamping plate rides over and mates with first locking taper 49 of the flange. By the application of further bolts 57, flange 45 is clamped between second locking taper 51 of clamping plate 47 and subsidiary clamping plate 55. In this regard, it is to be realised that first and second locking tapers 49, 51 can be self releasing (i.e. their taper can be greater than about 12 to 16 degrees) since subsidiary clamping plate 55 and further bolts 57 are effective to hold together first and second locking tapers 49, 51. When clamping plate 47 is pushed over flange 45 and further bolts 57 applied, the holes provided in clamping plate 47 for bolts 37 are aligned with bolt holes 39 in outer casing 9. Thus, at this stage the rotational position of mounting pin 11 with respect to outer casing 9 is determined. Finally, bolts 37 are threaded home to secure the rotational position of mounting pin 11. The bolts clamp a shoulder 59 of first end 19 of mounting pin 11 to first side 23 of outer casing 9.

If the need arises to remove temporarily mounting pin 11 then this is done by undoing bolts 37, but not further bolts 57, and removing mounting pin 11 and clamping plate 47 as one integral unit by virtue of the locking of clamping plate 47 to flange 45. Replacement of mounting pin 11 simply comprises the reapplication of bolts 37 to clamping plate 47 and outer casing 9 as this will automatically re-establish the correct rotational position of mounting pin 11 with respect to outer casing 9. Thus, again, the removal of mounting pin 11 and clamping plate 47 as one integral unit (i.e. in fixed relationship to one another) means that the correct rotational position of mounting pin 11 is not lost, and is automatically re-established when the pin/plate integral unit is replaced and bolts 37 applied.

The invention claimed is:

1. A mounting apparatus comprising:
   a mounting pin having first and second ends;
   an outer casing of an axial compressor of a gas turbine engine, the outer casing having first and second sides, the outer casing including a passage between the first and second sides for receiving the mounting pin so that the first end of the pin protrudes from the first side and the second end of the pin protrudes from the second side, the second end of the pin being configured to engage a stationary vane carrier of the axial compressor to mount the stationary vane carrier, the first end of the pin being operable to rotate the pin about the axis of the pin to vary the position of the stationary vane carrier; and
   a clamping plate for clamping the first end of the mounting pin to the first side of the outer casing for securing the rotational position of the pin with respect to the outer casing,
   wherein
   the first end of the pin includes a first locking taper which, with progression along the axis of the pin away from the second end of the pin, tapers from a first radial distance from the axis to a second reduced radial distance from the axis; and
   the clamping plate includes a second locking taper complementary to the first locking taper for locking with the first locking taper.

2. The mounting apparatus according to claim 1, wherein the second end of the mounting pin comprises an eccentric.

3. The mounting apparatus according to claim 1, wherein the first and second locking tapers are self locking.

4. The mounting apparatus according to claim 3, wherein the first end of the mounting pin includes a flange and the first locking taper is formed on the flange.

5. The mounting apparatus according to claim 4, wherein, when the first end of the mounting pin is clamped to the first side of the outer casing, the flange of the first end is clamped between the second locking taper of the clamping plate and the first side of the outer casing.

6. The mounting apparatus according to claim 1, wherein the first end of the mounting pin includes a flange and the first locking taper is formed on the flange, the mounting apparatus further comprises a subsidiary clamping plate, and the first and second locking tapers are lockable together by clamping the flange of the first end between the second locking taper and the subsidiary clamping plate.

7. The mounting apparatus according to claim 6, wherein the first and second locking tapers are self releasing.

8. The mounting apparatus according to claim 6, wherein the first end of the mounting pin includes a shoulder and, when the first end of the mounting pin is clamped to the first side of the outer casing, the shoulder of the first end is clamped to the first side of the outer casing.

\* \* \* \* \*